C. R. HAMILTON.
SELF FEEDER FOR SWINE.
APPLICATION FILED APR. 8, 1919.

1,346,784. Patented July 13, 1920.

Inventor
Clayton R. Hamilton,
By -
Hiram A. Sturges
Attorney

UNITED STATES PATENT OFFICE.

CLAYTON R. HAMILTON, OF PANORA, IOWA.

SELF-FEEDER FOR SWINE.

1,346,784.

Specification of Letters Patent.   Patented July 13, 1920.

Application filed April 8, 1919.   Serial No. 288,616.

*To all whom it may concern:*

Be it known that I, CLAYTON R. HAMILTON, a citizen of the United States, residing at Panora, in the county of Guthrie and State of Iowa, have invented certain new and useful Improvements in Self-Feeders for Swine, of which the following is a specification.

This invention relates to a self-feeder for swine, and has for its object to provide a container for grain or other foods, which may be conveniently and economically constructed, said container to be provided with feed openings and closures therefor and to be so arranged that the feed will be uniformly distributed, will be readily accessible to the swine for feeding purposes but will not be accessible to fowls. Other objects of the invention will be mentioned hereinafter.

Figure 1:
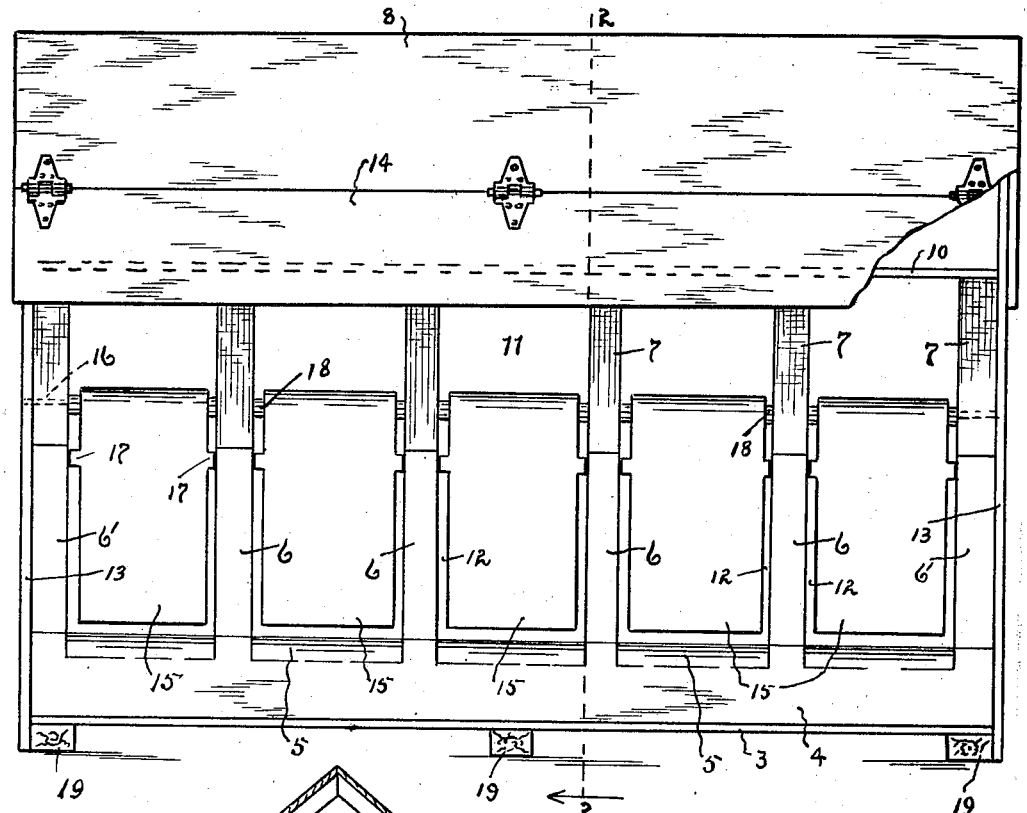
Figure 2:
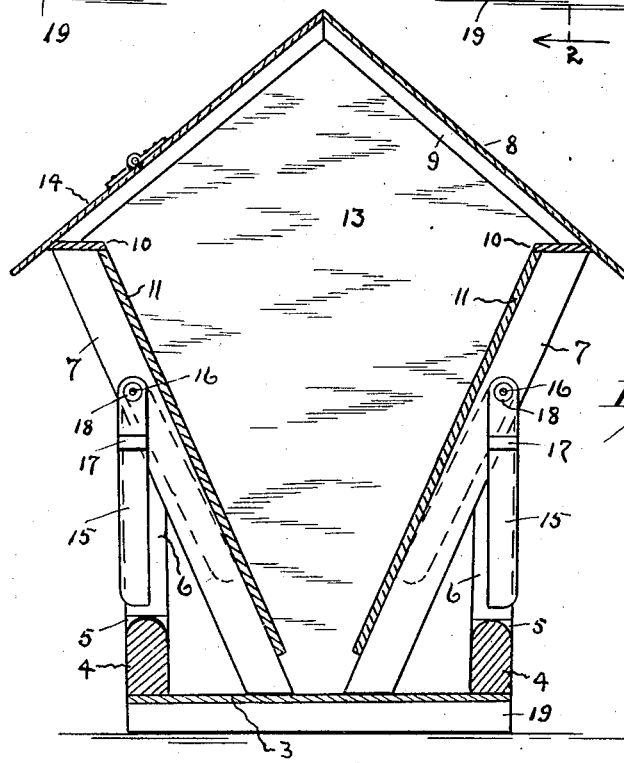

In the accompanying drawing which illustrates one embodiment of the invention, Figure 1 is a partly broken view of the feeder in side elevation. Fig. 2 is a view in transverse section on line 2—2 of Fig. 1.

Referring now to the drawing for a more particular description, numeral 3 indicates a floor of rectangular form, to the side edges of which is secured a pair of side plates 4, each preferably being provided with a plurality of curved thresholds 5 at longitudinal intervals, vertical braces or standards 6 being mounted upon and suitably secured to the side plates, intermediate the thresholds, and a pair of similar standards 6' being mounted upon the ends of the side plates.

Numerals 7 indicate wall studding, each being secured to the floor and to the upper end of a brace 6 or 6', said members 7 being disposed inclinedly in pairs, the lower ends of each pair being adjacent and comparatively near to each other, and their outer or upper ends being so disposed that they project outwardly of the side plates 4, the roof 8, which is supported by rafters 9 and framing-plates 10, extending outwardly of the standards 6 a sufficient distance to provide a shelter for the swine while feeding.

Numerals 11 indicate the sides of the self-feeder, these being secured to the inner edges of the wall studding 7 to extend downwardly from the plates 10 near to the lower ends of the studding; and as thus described, an elongated, downwardly convergent container is provided for grain or other suitable feed for swine, a plurality of feed-openings 12 being provided at each side, outwardly of, and in communication with the container, the ends of said container being indicated at 13. Numeral 14 indicates a suitable door which is provided for the roof, and preferably it extends the entire length of the roof to permit a deposit of the grain.

It will be noted that the parts of the structure, as described, inwardly of and adjacent to the side plates 4 provide a space between the ends 13 answering the functions of a feed trough, and in order that the grain or other feed may be readily accessible to swine and that poultry may be excluded, each opening 12 is provided with a door 15 arranged to be disposed, normally, in a vertical position by reason of its own weight, and in line with the posts or braces 6 and 6', said doors being pivotally mounted at their upper ends by pivot-pins or rods 16 which traverse the studding and upper ends of the doors.

In operation, the swine will cause the doors to swing inwardly and will maintain them in that position while feeding, the openings 12 being of suitable size or area to admit the heads of the swine, and the posts or braces 6 being of strong construction to resist all stresses directed thereto, and operating to separate the swine suitably while feeding, and, as is obvious, the doors will swing to a vertical position when the heads of the swine are withdrawn from the openings, and poultry will be excluded. In order that contact of the doors with the braces 6 and 6' will be prevented, which otherwise might be caused by undue stresses directed thereto by the swine while feeding, and that the doors may not be swung in a direction transverse to their normal movements, they are preferably provided intermediate their ends with lugs 17 adapted to engage the inner sides of the vertical posts or braces, their upper ends being provided with collars or washers 18 carried by the pivot-rods 16, and any transverse swinging movement of the doors, except inwardly and outwardly of the openings will be prevented.

Numerals 19 indicate sleepers operative to maintain the feeder above the ground practically free from dampness. In instances where the feeder is used under shelter, the roof may be dispensed with, but the roof, substantially as shown, is employed when the feeder is so located that it is exposed to rain.

I claim:

In a feeder receptacle for swine, the combination of an elongated container having downwardly convergent side walls including wall studding and having a floor substantially rectangular in plan projecting outwardly from said side walls, a pair of plates upon the floor outwardly of the side walls of the container, upright braces disposed upon and at longitudinal intervals of the side plates, said braces being connected with the studding of the side walls and providing a plurality of feed apertures in communication with the container, horizontal pivot-pins traversing the studding of the side walls above and in the vertical plane of said braces, a plurality of doors between said braces each being loosely mounted on a pivot-pin and provided with lugs between its top and bottom normally engaging the studding of the side walls, and a plurality of washers on the pivot-pins between the doors and studding of the side walls.

In testimony whereof, I have affixed my signature in presence of two witnesses.

CLAYTON R. HAMILTON.

Witnesses:
R. E. CASLOW,
V. L. TRUAX.